United States Patent [19]

French

[11] Patent Number: 5,824,911
[45] Date of Patent: Oct. 20, 1998

[54] FLUID PRESSURE MEASURING DEVICE INTERFACE

[75] Inventor: Daniel W. French, Portsmouth, R.I.

[73] Assignee: The United States of America as represented by the Secretary of the Navy, Washington, D.C.

[21] Appl. No.: 891,366

[22] Filed: Jul. 10, 1997

[51] Int. Cl.[6] ....................................................... G01L 7/00
[52] U.S. Cl. .............................................................. 73/756
[58] Field of Search .............................. 73/706, 730, 731, 73/756, 37, 46, 49.2, 49.3

[56] References Cited

U.S. PATENT DOCUMENTS 5,069,072  12/1991  Taylor et al. ............................... 73/756
5,293,780   3/1994  Chadwick et al. ......................... 73/756

Primary Examiner—William L. Oen
Attorney, Agent, or Firm—Michael J. McGowan; James M. Kasischke; Prithvi C. Lall

[57] ABSTRACT

A fluid pressure measuring device interface which may be used in a submersible platform or vehicle includes an interface chamber fluidly coupled to a conduit which leads to the fluid medium whose pressure is to be measured. The interface chamber encloses a liquid-filled deformable pressure transfer container or bladder, which is generally completely surrounded by the fluid medium whose pressure is being measured. A second conduit fluidly couples the bladder to a pressure measuring device. The device can perform fluid medium pressure measurements including water pressure and wave and tide measurements. When used in an underwater structure, the conduit coupled to the interface chamber connects to the exterior surface of the underwater structure, at a point generally vertically above the interface housing.

16 Claims, 2 Drawing Sheets

FLUID PRESSURE MEASURING DEVICE INTERFACE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field Of The Invention

This invention relates to a measuring device and more particularly, to an accurate fluid pressure measuring device interface for allowing the pressure of a fluid being measured to be transferred to a deformable, fluid filled fluid pressure transfer container.

2. Description of the Prior Art

Data gathering equipment and instruments used in underwater or ocean environments must be sturdy enough to withstand the rough conditions in the ocean. Equipment, instruments and unmanned vehicles must be able to withstand harsh environments and must be reliable since accessibility and repairs are especially difficult.

One such instrument that is typically used is a pressure or wave-tide recorder that is mounted on an underwater platform. The device measures the water pressure above the unit in real time. It is sensitive enough to detect changes in depth based on wave actions and tides.

Mounting such a wave-tide recorder instrument on an underwater platform is problematic. Prior art underwater platforms or vehicles with submersible equipment either put the equipment in a large free flood chamber inside the platform, or external to the platform. Mounted internally, a large free flood chamber sharply reduces the buoyancy of an underwater vehicle due to the large amount of water which is allowed to flood the internal area of the vehicle, and requires large structural bulkheads and multiple cable and plumbing penetrators and feedthroughs. Additionally, an underwater vehicle with a large free flood chamber is very unstable once flooded. Externally mounted equipment increases drag and hydrodynamic noise.

There are many other applications which would benefit from a reliable fluid pressure measuring device interface including, for example, measurement of hot, cold or caustic fluids such as underground crude oil, acid baths and other free and contained fluids.

Accordingly, what is needed is a fluid medium pressure measuring device interface which may be internally mounted to a unmanned undersea vehicle or other platform or device submerged in a fluid medium, and which does not require a large amount of fluid to be introduced into a chamber inside the vehicle or platform which changes the buoyancy and stability parameters of the vehicle.

SUMMARY OF THE INVENTION

The invention features a fluid pressure measuring device interface including an interface chamber fluidly coupled to a conduit which leads to the fluid medium whose pressure is to be measured. The interface chamber encloses a liquid-filled, deformable, fluid medium, pressure transfer container or bladder, which is completely surrounded by a limited quantity of fluid whose pressure is being measured. A second conduit fluidly couples the bladder to a pressure measuring and recording device. The bladder is typically filled with mineral oil based fluid that is not harsh and does not contaminate the sensitive pressure transducer.

The fluid medium pressure measuring device interface may be used in submersible structures such as submarines or unmanned underwater structures, platforms or vehicles. It can perform water pressure and wave and tide measurements. For use in an underwater structure, the conduit coupled to the interface chamber connects to the exterior surface of the underwater structure, at a point generally vertically above the interface chamber housing.

An end plug in the interface chamber allows access to the chamber for flushing and cleaning. The interface housing is preferably constructed of machined stainless steel. The bladder preferably is of synthetic or natural rubber construction and filled with oil, generally mineral oil.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

DESCRIPTION OF THE PREFERRED EMBODIMENT

Figure 1:
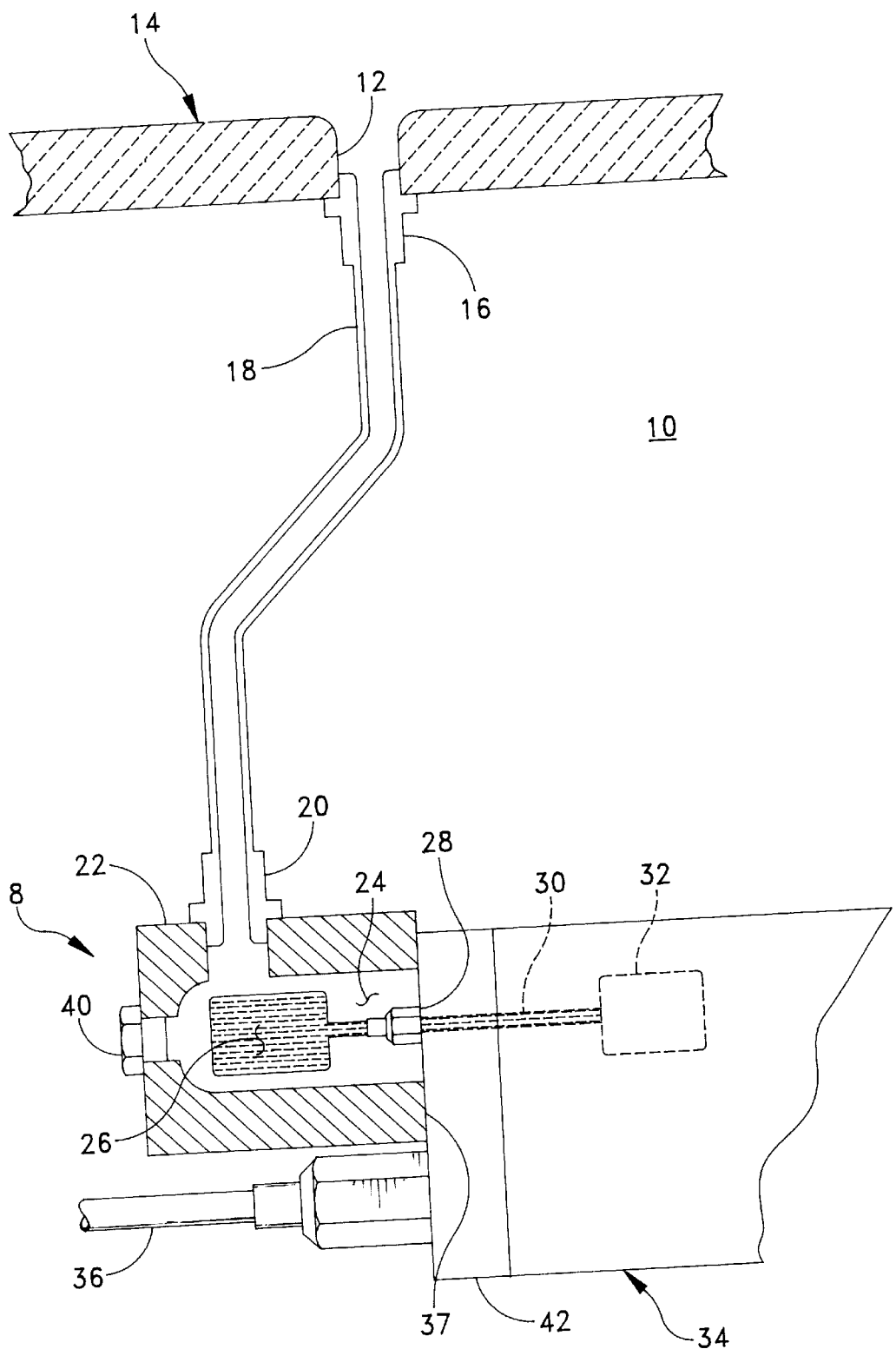
FIG. 1 is a cross-sectional schematic diagram of the measuring device interface of the present invention.

A fluid pressure measuring device interface 8, FIG. 1 according to the present invention may be employed inside a submersible structure 10. A submersible structure includes, but is not limited to, a Large Diameter Unmanned Undersea Vehicle (LDUUV), which is a powered undersea vehicle used for data collection. The fluid pressure measuring device interface 8 is exposed to fluid or water pressure through an opening 12 in the exterior surface or hull 14 of the submerged structure 10. The fluid whose pressure is being measured flows through conduit 18 into interface housing 22.

In the preferred embodiment, conduit 18 is connected to opening 12 in the hull through-connection 16 which is a typical ¼ inch tube high pressure fitting which utilizes a beveled crush on an O-ring as a seal. A similar connection 20 connects conduit 18 to interface housing 22.

Interface housing 22 is typically mounted directly on end plate 42 of a commercially available measuring device such as an oceanographic sensor 34 known as a wave and tide recorder. In the preferred embodiment, interface housing 22 is typically machined from a block of stainless steel although any suitable material such as aluminum or plastic may be used.

Interface housing 22 encloses and forms a cavity or flood chamber 24 which is large enough to hold a pressure sensing deformable bladder 26. Typically, cavity or flood chamber 24 is approximately 1.25 inches in diameter and 2.624 inches in length. A bladder 26 is constructed from a deformable material such as rubber, or reinforced polypropylene, and is filled with an appropriate amount of fluid, preferably a non-compressible fluid such as mineral oil. Bladder 26 may be constructed from any material which allows pressure to be transferred to the internal fluid, and can withstand the environmental conditions including rubber, polypropylene, plastics, and other materials by employing "accordion" type folding construction. The pressure transfer liquid employed inside bladder 26 can be any fluid which meets the environmental requirements of temperature range and compressibility, such as oil. Bladder 26 which typically measures 1.00 inch by 0.75 inch and is connected to base plate 42 of wave and tide recorder 34 by seal 28. Seal 28 connects to conduit 30 which transfers the oil pressure to pressure sensing device 32 within the oceanographic sensor 34. In the preferred embodiment, oceanographic sensor 34 is a time recording pressure sensor which can measure minute changes in pressure such as caused by waves on the surface of the water above submerged structure 10.

Wave and tide recorder 34 typically includes an electronic connection outlet 36 which carries data from pressure sensing device 32 to a data storage device or other means of collecting, displaying and/or recording data.

Flood chamber 24 contains a small enough volume (typically 2.964 cubic inches) to not substantially change the ballast of submersible structure 10, yet allows bladder 26 to be completely surrounded by the fluid whose pressure is being measured.

In the preferred embodiment, the fluid pressure measuring device interface 8 is placed inside submersible structure 10 so that conduit 18 is generally vertically oriented above flood chamber 24. This orientation guarantees that once the submersible structure 10 is submerged, fluid will enter opening 12 and substantially completely fill flood chamber 34. Even if some air remains inside flood chamber 24, fluid pressure measuring device interface 8 will still function correctly.

Figure 2:
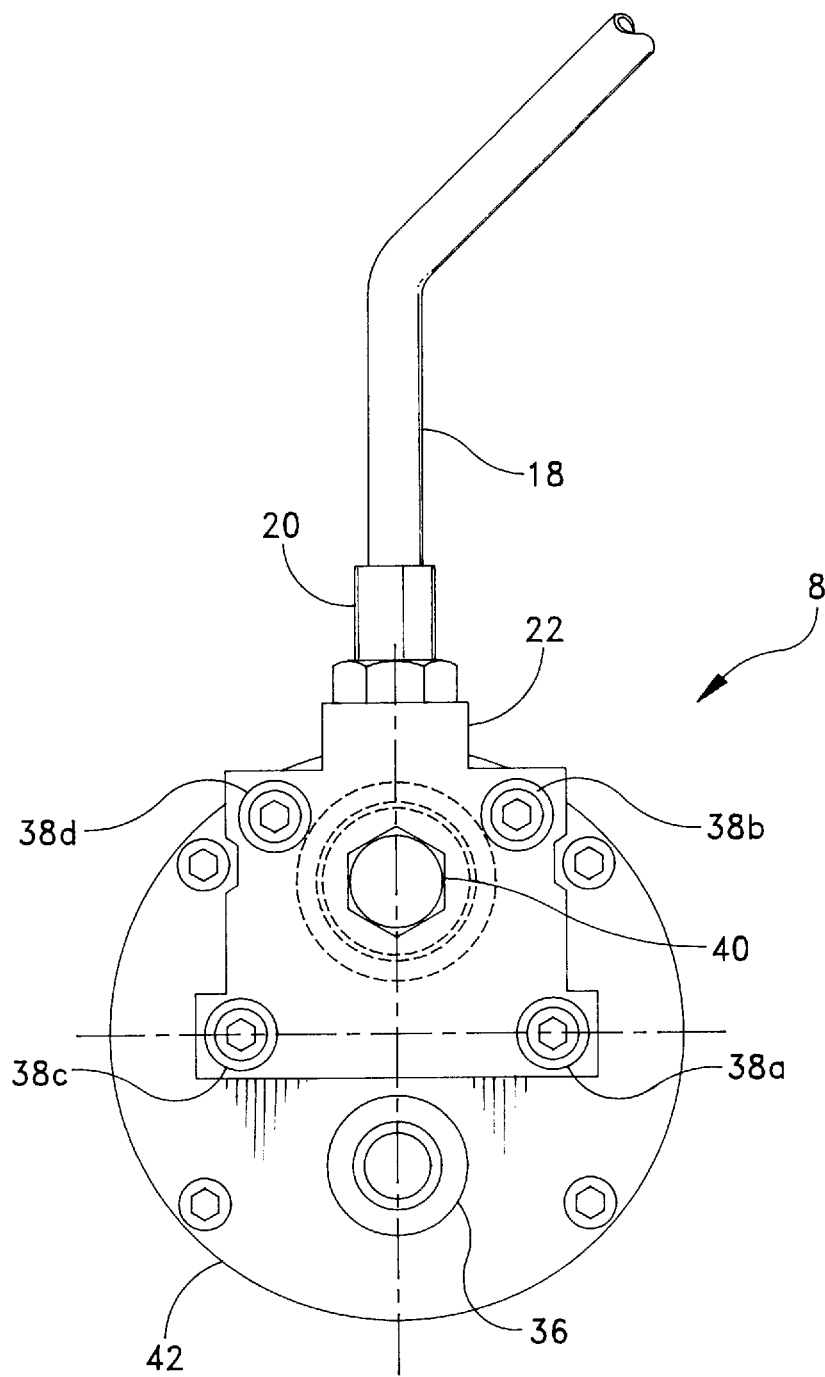
FIG. 2 is an end view of the measuring device interface of the present invention.

Interface housing 22 is mounted to the front of wave and tide recorder 34 using an o-ring seal 37. Mounting screws 38*a*, 38*b*, 38*c* and 38*d*, FIG. 2, secure interface housing 22, and allow interface housing 22 to be removed if necessary. An access port 40 allows access to flood chamber 24, for cleaning and flushing. Access port 40 is a threaded screw plug with o-ring seal (not shown).

Bladder 26 is completely surrounded by the fluid whose pressure is being measured. This allows bladder 26 and pressure sensing or measuring device 32 to be extremely accurate in measuring fluctuations and fluid pressure. Any variation in pressure is translated through the collapsible membrane of bladder 26 to the fluid in conduit 30, to be measured by measuring device 32. Measuring device 32 is completely isolated from the fluid medium whose pressure is being measured. This allows the fluid pressure measuring device interface 8 to be used in any environment and any type of fluid where accurate measurements are required. The device may be used to measure extremely hot, cold or corrosive fluids, for example measuring crude oil pressure in an oil well. Other potential uses include measuring pressures inside an enclosed containers such as a tank or pool.

Accordingly, the present invention provides a fluid pressure measuring device which is optimal for use in a submersible vessel. The interface opening is small and will not interfere with surface integrity of the vessel. No external parts protrude outside the surface of the vessel to cause turbulence. The volume of the flood chamber of the interface will not substantially affect the ballast weight of the vessel. Additionally, the measuring device is isolated and protected from sea water and other corrosive or toxic environments.

Modifications and substitutions by one of ordinary skill in the art are considered to be within the scope of the present invention which is not to be limited except by the claims which follow.

What is claimed is:

1. A fluid medium pressure measuring device interface comprising:

an interface chamber;

a fluid medium conduit, fluidly coupled to said interface chamber, and to an external fluid medium source whose pressure is to be measured;

a deformable pressure transfer container, disposed in said interface chamber and completely surrounded by said fluid medium in said interface chamber;

a liquid disposed in said deformable pressure transfer container;

a fluid pressure measuring device; and a pressure transfer container fluid conduit, fluidly coupled between said deformable pressure transfer container and said fluid pressure measuring device.

2. The fluid medium pressure measuring device interface as in claim 1 wherein said fluid medium pressure measuring device interface chamber is disposed in a submersible structure.

3. The fluid medium pressure measuring device interface as in claim 1 wherein said external fluid medium is sea water.

4. The fluid medium pressure measuring device interface as in claim 3 wherein said fluid medium pressure measuring device is used to measure waves and tides.

5. The fluid medium pressure measuring device interface as in claim 2 wherein said fluid medium conduit is fluidly coupled to an exterior surface of said submersible structure.

6. The fluid medium pressure measuring device interface as in claim 5 wherein said fluid medium conduit is generally vertically disposed above said interface chamber.

7. The fluid medium pressure measuring device interface as in claim 1 wherein said interface chamber includes an end plug.

8. The fluid medium pressure measuring device interface as in claim 1 wherein said interface chamber is stainless steel.

9. The fluid medium pressure measuring device interface as in claim 1 wherein said deformable pressure transfer container includes a polypropylene container.

10. The fluid medium pressure measuring device interface as in claim 1 wherein said liquid in said deformable pressure transfer container includes a generally non-compressible fluid.

11. The fluid medium pressure measuring device interface as in claim 10 wherein said generally non-compressible fluid includes oil.

12. A fluid medium pressure measuring system comprising:

a submersible structure disposed in an external fluid medium;

a fluid medium pressure measuring device interface including:

an interface chamber;

a fluid medium conduit fluidly coupled to said interface chamber, and to said external fluid medium whose pressure is to be measured;

a deformable pressure transfer container, disposed in said interface chamber and completely surrounded by said fluid medium in said interface chamber;

a liquid disposed in said deformable pressure transfer container;

a fluid pressure measuring device;

a pressure transfer container fluid conduit, fluidly coupled between said deformable pressure transfer container and said fluid pressure measuring device; and said fluid pressure measuring device, fluidly coupled to said deformable pressure transfer container, for measuring said external fluid medium pressure and for providing an output signal indicating said fluid medium pressure.

13. The fluid medium pressure measuring system as claimed in claim 12 wherein said fluid medium pressure interface is used to measure waves and tides.

14. The fluid medium pressure measuring system as claimed in claim 12 wherein said fluid medium conduit is fluidly coupled to an exterior surface of said submersible structure.

15. The fluid medium pressure measuring system as claimed in claim 12 wherein said deformable pressure transfer container includes a polypropylene container.

16. The fluid medium pressure measuring system as claimed in claim 12 wherein said liquid disposed in said deformable pressure transfer container is oil.

\* \* \* \* \*